United States Patent
Lee et al.

(10) Patent No.: US 9,372,343 B2
(45) Date of Patent: Jun. 21, 2016

(54) HEAD-UP DISPLAY, VEHICLE AND CONTROLLING METHOD OF HEAD-UP DISPLAY

(75) Inventors: Bing-Yen Lee, Taoyuan County (TW); Shu-Hsiang Yang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 410 days.

(21) Appl. No.: 13/348,658

(22) Filed: Jan. 12, 2012

(65) Prior Publication Data
US 2013/0181887 A1    Jul. 18, 2013

(51) Int. Cl.
*G02B 27/01*   (2006.01)
*B60K 35/00*   (2006.01)
*G02F 1/1333*  (2006.01)

(52) U.S. Cl.
CPC ............... *G02B 27/01* (2013.01); *B60K 35/00* (2013.01); *G02B 2027/0118* (2013.01); *G02F 2001/133331* (2013.01); *G02F 2203/62* (2013.01)

(58) Field of Classification Search
None
See application file for complete search history.

(56) References Cited

U.S. PATENT DOCUMENTS

| | | | |
|---|---|---|---|
| 4,711,544 A | 12/1987 | Iino et al. | |
| 5,497,271 A * | 3/1996 | Mulvanny et al. | 359/631 |
| 7,034,778 B1 | 4/2006 | Hähl | |
| 2002/0003571 A1* | 1/2002 | Schofield et al. | 348/148 |
| 2003/0214474 A1* | 11/2003 | Aoki et al. | 345/87 |
| 2007/0171329 A1* | 7/2007 | Freeman et al. | 349/65 |
| 2008/0048932 A1* | 2/2008 | Yanagisawa | 345/9 |
| 2009/0141496 A1* | 6/2009 | Yamamoto et al. | 362/259 |
| 2010/0127825 A1* | 5/2010 | Drummond et al. | 340/5.71 |
| 2011/0170023 A1* | 7/2011 | Ishida | 348/837 |
| 2011/0273659 A1* | 11/2011 | Sobecki | 349/195 |
| 2012/0050142 A1* | 3/2012 | Border et al. | 345/8 |
| 2012/0224062 A1* | 9/2012 | Lacoste et al. | 348/148 |
| 2012/0228392 A1* | 9/2012 | Cameron et al. | 236/34 |

FOREIGN PATENT DOCUMENTS

| | | |
|---|---|---|
| CN | 101064092 A | 10/2007 |
| CN | 101287623 | 10/2008 |
| CN | 101512632 | 8/2009 |
| CN | 201302627 Y | 9/2009 |
| CN | 201780419 U | 3/2011 |
| DE | 10353156 | 6/2004 |

(Continued)

OTHER PUBLICATIONS

"Office Action of Germany counterpart application" issued on Jun. 26, 2013, p. 1-p. 10, in which the listed references were cited.

(Continued)

*Primary Examiner* — Gerald Johnson
*Assistant Examiner* — Maheen Javed
(74) *Attorney, Agent, or Firm* — Jianq Chyun IP Office

(57) ABSTRACT

A head-up display including a casing, a control circuit board, a display panel, and a plate is provided. The control circuit board is disposed in the casing. The display panel is disposed in the casing and electrically connected to the control circuit board. The plate is fixed to the casing and covers the display panel. The transmittance of the plate is capable of being changed, so that an image displayed on the display panel is projected out through the plate, or external light is stopped from illuminating the display panel through the plate. A vehicle having the head-up display and a controlling method of the head-up display are provided as well.

21 Claims, 3 Drawing Sheets

(56) References Cited

FOREIGN PATENT DOCUMENTS

| | | |
|---|---|---|
| DE | 102011105689 | 12/2012 |
| JP | 2005035406 | 2/2005 |
| TW | 201028733 | 8/2010 |
| TW | 201122548 | 7/2011 |
| TW | M411585 | 9/2011 |

OTHER PUBLICATIONS

"Office Action of Taiwan Counterpart Application", issued on Feb. 27, 2014, p. 1-p. 7, in which the listed references were cited.
"Office Action of China Counterpart Application", issued on Sep. 23, 2014, p. 1-p. 13, in which the listed references were cited.

* cited by examiner 740　742　744

| changing transmittance of the plate, such that an image displayed on the display panel is projected out through the plate, or external light is stopped from illuminating the display panel through the plate | ~ S602 |

HEAD-UP DISPLAY, VEHICLE AND CONTROLLING METHOD OF HEAD-UP DISPLAY

TECHNICAL FIELD

The disclosure relates to a head-up display, a vehicle having the head-up display, and a controlling method of the head-up display.

DESCRIPTION OF RELATED ART

Head-up displays are frequently applied to aircrafts as supplementary equipment of aviation. Some automobiles are also equipped with the head-up displays, so as to project status data (e.g., car speed, rotation speed, engine coolant temperature, whether car doors are closed, mileage, fuel consumption, etc.) of the automobiles onto the windshields for drivers' reference.

The automotive head-up display is often configured around the windshield, so as to project data images onto the windshield. However, when the automobile is exposed to strong sunlight, the sun is apt to continuously irradiate the head-up display through the windshield. Thereby, the display panel of the head-up display may be damaged because of the overly high temperature, thus deteriorating the reliability of the head-up display.

SUMMARY

The disclosure is directed to a head-up display with favorable reliability.

The disclosure is directed to a vehicle of which a head-up display has favorable reliability.

The disclosure is directed to a controlling method of a head-up display. The controlling method is capable of ameliorating reliability of the head-up display.

In the disclosure, a head-up display that includes a casing, a control circuit board, a display panel, and a plate is provided. The control circuit board is disposed in the casing. The display panel is disposed in the casing and electrically connected to the control circuit board. The plate is fixed to the casing and covers the display panel. The transmittance of the plate is capable of being changed, such that an image displayed on the display panel is projected out through the plate, or external light is stopped from illuminating the display panel through the plate.

In the disclosure, a vehicle that includes a body and an electronic system is provided. The body has a windshield. The electronic system includes a head-up display. The head-up display includes a casing, a control circuit board, a display panel, and a plate. The casing is fixed into the body. The control circuit board is disposed in the casing. The display panel is disposed in the casing and electrically connected to the control circuit board. The plate is fixed to the casing and covers the display panel. The transmittance of the plate is capable of being changed, such that an image displayed on the display panel is projected to the windshield through the plate, or external light is stopped from illuminating the display panel through the plate.

In the disclosure, a controlling method of a head-up display is provided. The controlling method is suitable for a head-up display that includes a display panel and a plate. The plate covers the display panel. In the controlling method, transmittance of the plate is changed, such that an image displayed on the display panel is projected out through the plate, or external light is stopped from illuminating the display panel through the plate.

Based on the above, the head-up display described herein has the plate that covers the display panel, and the transmittance of the plate is capable of being changed. Thereby, when the vehicle is not in a driving mode, or when the driver does not utilize the head-up display, the transmittance of the plate may be reduced for preventing the sun from irradiating the display panel through the plate. As such, the display panel is not damaged due to the overly high temperature, and the reliability of the head-up display may be ameliorated.

Other features and advantages of the disclosure will be further understood from the further technological features disclosed by the embodiments of the disclosure wherein there are shown and described embodiments of this disclosure, simply by way of illustration of modes best suited to carry out the disclosure.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
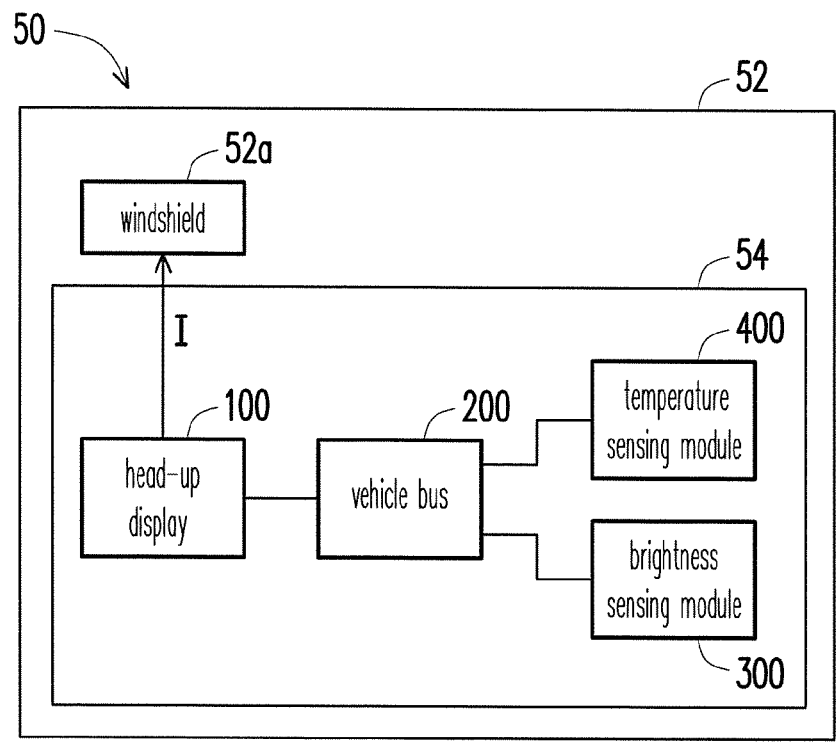
FIG. 1 is a block diagram illustrating a vehicle according to an embodiment of the disclosure.
Figure 2:
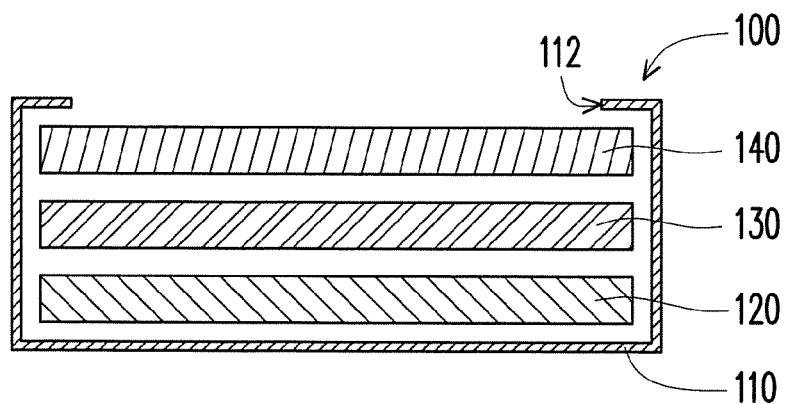
FIG. 2 is a cross-sectional view illustrating the head-up display depicted in FIG. 1.

FIG. 1 is a block diagram illustrating a vehicle according to an embodiment of the disclosure. FIG. 2 is a cross-sectional view illustrating the head-up display depicted in FIG. 1. With reference to FIG. 1 and FIG. 2, the vehicle 50 of the present embodiment includes a body 52 and an electronic system 54. The body 52 has a windshield 52a, and the electronic system 54 includes a head-up display 100.

The head-up display 100 includes a casing 110, a control circuit board 120, a display panel 130, and a plate 140. The casing 110 is fixed into the body 52. The control circuit board 120 is disposed in the casing 110. The display panel 130 is disposed in the casing 110 and electrically connected to the control circuit board 120. The plate 140 is fixed to the casing 110 and covers the display panel 130. The transmittance of the plate 140 is capable of being changed, such that an image I displayed on the display panel 130 is projected to the windshield 52a through the plate 140, or external light is stopped from illuminating the display panel 130 through the plate 140.

Under said circumstances, when the vehicle 50 is not in a driving mode, or when the driver does not utilize the head-up display 100, the transmittance of the plate 140 may be reduced for preventing the sun from irradiating the display panel 130 through the plate 140. As such, the display panel 130 is not damaged due to the overly high temperature, and the reliability of the head-up display 100 may be ameliorated.

In the present embodiment, the plate 140 is a liquid crystal panel, for instance, and the transmittance of the plate 140 is capable of being changed. For instance, when the vehicle 50 is started, the plate 140 is supplied with power and thus drives the plate 140, so as to increase the transmittance of the plate 140. At this time, the driver is capable of watching the data displayed on the display panel 130 through the plate 140. By contrast, when the vehicle 50 is not activated, the plate 140 stops being supplied with the power and stops driving the plate 140. At this time, the transmittance of the plate 140 decreases, such that light is prevented from illuminating the display panel 130 through the plate 140.

The way to adjust the transmittance of the plate 140 is not limited in the disclosure. Namely, the transmittance of the plate 140 may be changed by starting or stopping the vehicle 50, as described above, and said transmittance may also be modified in another manner. Relevant explanations are provided in the following embodiment.

As indicated in FIG. 1, the electronic system 54 described in the embodiment may further include a vehicle bus 200 and a brightness sensing module 300. The vehicle bus 200 is disposed in the body 52, and the brightness sensing module 300 is disposed in the body 52 and electrically connected to the vehicle bus 200. The brightness sensing module 300 is capable of uploading a brightness value sensed by the brightness sensing module 300 to the vehicle bus 200, and the control circuit board 120 is capable of driving the plate 140 according to the brightness value downloaded from the vehicle bus 200, so as to change the transmittance of the plate 140. The vehicle bus 200 may include a controller area network bus (CAN-bus) or any other appropriate bus, which should not be construed as a limitation to the disclosure. In the present embodiment, the brightness sensing module 300 is connected to the head-up display 100 through the vehicle bus 200. Nonetheless, in another embodiment not shown in the drawings, the brightness sensing module 300 may be directly connected to the head-up display 100 and directly transmit the brightness value sensed by the brightness sensing module 300 to the control circuit board 120 (shown in FIG. 2) of the head-up display 100. This should not be construed as a limitation to the disclosure.

For instance, when the brightness sensing module 300 detects a relatively high ambient brightness value, a control signal may be transmitted to the plate 140 through the vehicle bus 200 and the control circuit board 120, so as to drive the plate 140 and increase the transmittance of the plate 140. This allows a user to clearly observe the data displayed on the display panel 130 even though the ambient brightness value is high. On the contrary, when the brightness sensing module 300 detects a relatively low ambient brightness value, another control signal may be transmitted to the plate 140 through the vehicle bus 200 and the control circuit board 120, so as to drive the plate 140 and decrease the transmittance of the plate 140. As such, even though the ambient brightness value is low, the brightness of the head-up display 100 will not be too high for the user.

As indicated in FIG. 1, the electronic system 54 described in the embodiment may further include a temperature sensing module 400. The temperature sensing module 400 is disposed in the body 52 and electrically connected to the vehicle bus 200. The temperature sensing module 400 is capable of uploading temperature sensed by the temperature sensing module 400 to the vehicle bus 200, and the control circuit board 120 is capable of driving the plate 140 according to the temperature downloaded from the vehicle bus 200, so as to change the transmittance of the plate 140. In the present embodiment, the temperature sensing module 400 is connected to the head-up display 100 through the vehicle bus 200. Nonetheless, in another embodiment not shown in the drawings, the temperature sensing module 400 may be directly connected to the head-up display 100 and directly transmit the temperature sensed by the temperature sensing module 400 to the control circuit board 120 (shown in FIG. 2) of the head-up display 100. This should not be construed as a limitation to the disclosure.

For instance, when the temperature sensing module 400 detects relatively high ambient temperature, a control signal may be transmitted to the plate 140 through the vehicle bus 200 and the control circuit board 120, so as to drive the plate 140 and decrease the transmittance of the plate 140. Thereby, the sunlight irradiating the display panel 130 through the plate 140 may be reduced, and the temperature of the display panel 130 is not excessively high due to the sun exposure. By contrast, when the temperature sensing module 400 detects relatively low ambient temperature, another control signal may be transmitted to the plate 140 through the vehicle bus 200 and the control circuit board 120, so as to drive the plate 140 and increase the transmittance of the plate 140. This allows a user to clearly observe the data displayed on the display panel 130.

With reference to FIG. 2, the plate 140 of the present embodiment is configured in the casing 110. The casing 110 has an opening 112, and the opening 112 exposes the plate 140, such that the user is capable of observing the image displayed on the display panel 130 through the opening 112. The type and the configuration of the plate 140 are not limited in the disclosure and are exemplified below with reference to drawings.

Figure 3:
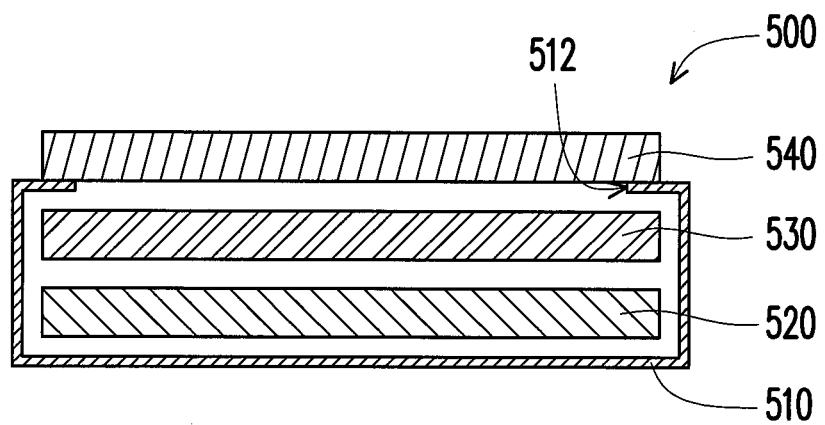
FIG. 3 is a cross-sectional view illustrating a head-up display according to another embodiment of the disclosure.

FIG. 3 is a cross-sectional view illustrating a head-up display according to another embodiment of the disclosure. With reference to FIG. 3, the head-up display 500 of the present embodiment includes a casing 510, a control circuit board 520, a display panel 530, and a plate 540. The configuration of the casing 510, the control circuit board 520, and the display panel 530 is similar to the configuration of the casing 110, the control circuit board 120, and the display panel 130 shown in FIG. 2, and thus no relevant description is further provided hereinafter. The difference between the head-up display 500 of the present embodiment and the head-up display 100 shown in FIG. 2 lies in that the opening 512 of the casing 500 exposes the display panel 530, and the plate 540 is disposed outside the casing 510 and covers the opening 512.

Figure 4:
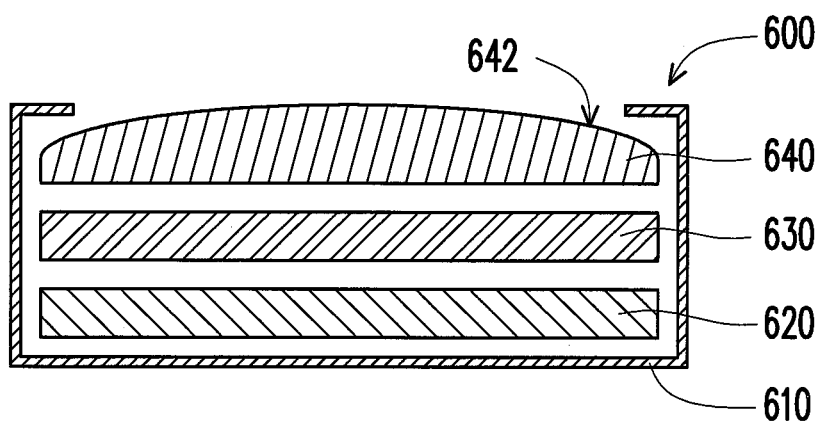
FIG. 4 is a cross-sectional view illustrating a head-up display according to another embodiment of the disclosure.

FIG. 4 is a cross-sectional view illustrating a head-up display according to another embodiment of the disclosure. With reference to FIG. 4, the head-up display 600 of the present embodiment includes a casing 610, a control circuit board 620, a display panel 630, and a plate 640. The configuration of the casing 610, the control circuit board 620, and the display panel 630 is similar to the configuration of the casing 110, the control circuit board 120, and the display panel 130 shown in FIG. 2, and thus no relevant description is further provided hereinafter. The difference between the head-up display 600 of the present embodiment and the head-up display 100 shown in FIG. 2 lies in that the plate 640 has a light emitting surface 642. Since the light emitting surface 642 is a convex surface, the image displayed on the display panel 630 is enlarged when being projected out through the light emitting surface 642. Thereby, the head-up display 600 with small volume may be applied to project a sufficiently large data image, so as to economize the configuration space.

Figures 5, 6:
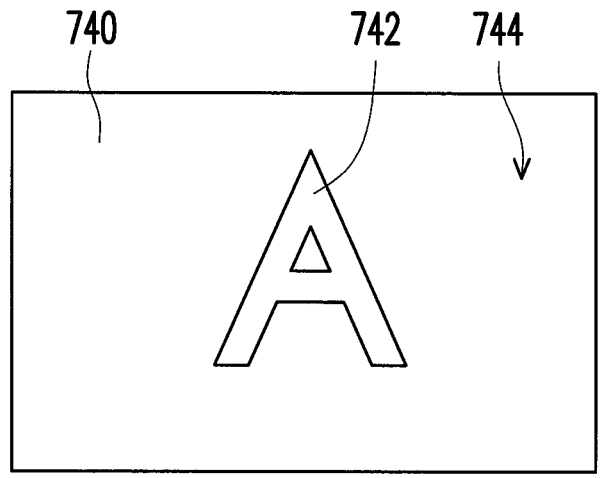
FIG. 5 is a top view illustrating a plate according to another embodiment of the disclosure.
FIG. 6 is a flow chart illustrating a controlling method of a head-up display according to an embodiment of the disclosure.

FIG. 5 is a top view illustrating a plate according to another embodiment of the disclosure. With reference to FIG. 5, transmittance of one region 742 of the plate 740 of the present embodiment increases relative to transmittance of the other region 744 of the plate 740, such that light emitted from the display panel is projected out through the region 742 of the plate 740 and forms patterns or letters. As indicated in FIG. 5, the region 742 is shaped as the letter A, for instance, while the region 742 may be shaped as another letter or another pattern in another embodiment for displaying certain images or other data when the head-up display is switched on or switched off.

In the following embodiment, the head-up display 100 shown in FIG. 2 is applied to elaborate a controlling method of a head-up display in the disclosure. FIG. 6 is a flow chart illustrating a controlling method of a head-up display according to an embodiment of the disclosure. With reference to FIG. 2 and FIG. 6, the controlling method of the head-up display of the present embodiment is adapted to the head-up display 100. The controlling method includes step S602 shown in FIG. 6: changing transmittance of the plate 140, such that an image displayed on the display panel 130 is projected out through the plate 140, or external light is stopped from illuminating the display panel 130 through the plate 140.

Specifically, the step of changing the transmittance of the plate 140 may include supplying power to the plate 140 to increase the transmittance of the plate 140, or stop supplying the power to the plate 140 to decrease the transmittance of the plate 140, for instance. Besides, the step of changing the transmittance of the plate 140 may also include driving the plate 140 through the control circuit board 120, so as to change the transmittance of the plate 140. Here, the control circuit board 120 is electrically connected to the plate 140 and the display panel 130. The transmittance of the plate 140 may be further modified according to the brightness value sensed by the brightness sensing module 300 shown in FIG. 1 or according to the temperature sensed by the temperature sensing module 400 shown in FIG. 1.

In light of the foregoing, the head-up display in the disclosure has the plate that covers the display panel, and the transmittance of the plate is capable of being changed. Thereby, when the vehicle is not in a driving mode, or when the driver does not utilize the head-up display, the transmittance of the plate may be reduced for preventing the sun from irradiating the display panel through the plate. As such, the display panel is not damaged due to the overly high temperature, and the reliability of the head-up display may be ameliorated.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A head-up display adapted to a vehicle, the vehicle having a windshield, the head-up display comprising:
   a casing;
   a control circuit board disposed in the casing;
   a display panel disposed in the casing and coupled to the control circuit board, wherein the display panel is aligned to a displaying region of the head-up display; and
   a plate, disposed in the casing and covering the display panel, wherein when the vehicle is started, the control circuit board receives power, and the transmittance of the plate is increased so that an image displayed on the display panel is directly projected to the windshield through the plate, and when the vehicle is not activated, the control circuit board does not receive power, and the transmittance of the plate is decreased such that an external light via the windshield irradiating on the display panel through the plate is reduced,
   wherein the display panel has a display surface facing the plate, the plate has a rear surface facing the display panel, and an area of the display surface is not smaller than an area of the rear surface.

2. The head-up display as recited in claim 1, wherein the plate is a liquid crystal panel.

3. The head-up display as recited in claim 1, wherein the plate is electrically connected to the control circuit board, and the control circuit board is capable of transmitting a control signal to the plate, so as to change the transmittance of the plate.

4. The head-up display as recited in claim 1, wherein the plate has a light emitting surface, the light emitting surface is a convex surface, and the image displayed on the display panel is projected out through the light emitting surface and is enlarged.

5. The head-up display as recited in claim 1, wherein the plate is fixed into the casing, the casing has an opening, and the opening exposes the plate.

6. The head-up display as recited in claim 1, wherein the casing has an opening, the opening exposes the display panel, and the plate is fixed onto the casing and covers the opening.

7. The head-up display as recited in claim 1, wherein transmittance of one region of the plate increases relative to transmittance of the other region of the plate, such that light emitted from the display panel is projected out through the region of the plate and forms patterns or letters.

8. A vehicle having a network bus comprising:
   a body having a windshield; and
   an electronic system comprising:
   a head-up display comprising:
   a casing fixed into the body;
   a control circuit board disposed in the casing and coupled to the network bus;
   a display panel disposed in the casing and coupled to the control circuit board, wherein the display panel is aligned to a displaying region of the head-up display; and
   a plate, disposed in the casing and covering the display panel, wherein when the vehicle is started, the control circuit board receives power, and the transmittance of the plate is increased so that an image displayed on the display panel is directly projected to the windshield through the plate, and when the vehicle is not activated, the control circuit board does not receive power, and the transmittance of the plate is decreased such that an external light via the windshield irradiating on the display panel through the plate is reduced,
   wherein the display panel has a display surface facing the plate, the plate has a rear surface facing the display panel, and an area of the display surface is not smaller than an area of the rear surface.

9. The vehicle as recited in claim 8, wherein the plate is electrically connected to the control circuit board, and the control circuit board is capable of driving the plate, so as to change the transmittance of the plate.

10. The vehicle as recited in claim 9, wherein the electronic system further comprises:
   a brightness sensing module disposed in the body and coupled to the network bus, wherein the brightness sensing module generates a brightness value according to brightness of an environment and transmitted the brightness value to the control circuit board via the network bus, and the control circuit board drives the plate according to the brightness value, so as to change the transmittance of the plate.

11. The vehicle as recited in claim 9, wherein the electronic system further comprises:

a temperature sensing module disposed in the body and coupled to the network bus, wherein the temperature sensing module senses temperature and transmitted the sensed temperature to the control circuit board via the network bus, and the control circuit board drives the plate according to the temperature, so as to change the transmittance of the plate.

12. The vehicle as recited in claim 8, wherein the display is a liquid crystal display.

13. The vehicle as recited in claim 8, wherein the plate has a light emitting surface, the light emitting surface is a convex surface, and the image displayed on the display panel is projected out through the light emitting surface and is enlarged.

14. The vehicle as recited in claim 8, wherein the plate is disposed into the casing, the casing has an opening, and the opening exposes the plate.

15. The vehicle as recited in claim 8, wherein the casing has an opening, the opening exposes the display panel, and the plate is disposed onto the casing and covers the opening.

16. The vehicle as recited in claim 8, wherein transmittance of one region of the plate increases relative to transmittance of the other region of the plate, such that light emitted from the display panel is projected out through the region of the plate and forms patterns or letters.

17. A controlling method for a head-up display adapted to a vehicle, the vehicle having a windshield, the head-up display comprising a display panel, a plate covering the display panel, and a control circuit board, the controlling method comprising:

sensing temperature or brightness of an environment; and
changing transmittance of the plate,
wherein when the vehicle is started, the control circuit board receives power, and the transmittance of the plate is increased according to the temperature or the brightness of the environment so that an image displayed on the display panel is directly projected to the windshield through the plate, and when the vehicle is not activated, the control circuit board does not receive power, and the transmittance of the plate is decreased such that an external light via the windshield irradiating on the display panel through the plate is reduced, wherein the display panel is aligned to a displaying region of the head-up display, wherein the display panel has a display surface facing the plate, the plate has a rear surface facing the display panel, and an area of the display surface is not smaller than an area of the rear surface.

18. The controlling method of the head-up display as recited in claim 17, wherein the step of changing the transmittance of the plate comprises:

supplying power to the plate to increase the transmittance of the plate, or stop supplying the power to the plate to decrease the transmittance of the plate.

19. The controlling method of the head-up display as recited in claim 17, wherein the step of changing the transmittance of the plate comprises:

driving the plate through a control circuit board, so as to change the transmittance of the plate, wherein the control circuit board is electrically connected to the plate and the display panel.

20. The controlling method of the head-up display as recited in claim 17, wherein the step of changing the transmittance of the plate comprises:

changing the transmittance of the plate according to a brightness value sensed by a brightness sensing module.

21. The controlling method of the head-up display as recited in claim 17, wherein the step of changing the transmittance of the plate comprises:

changing the transmittance of the plate according to temperature sensed by a temperature sensing module.

* * * * *